C. B. WEAVER.
MACHINE FOR STAMPING SHEET METAL SHROUDS FOR AUTOMOBILE BODIES.
APPLICATION FILED FEB. 13, 1918.
1,284,838.
Patented Nov. 12, 1918.
3 SHEETS—SHEET 3.
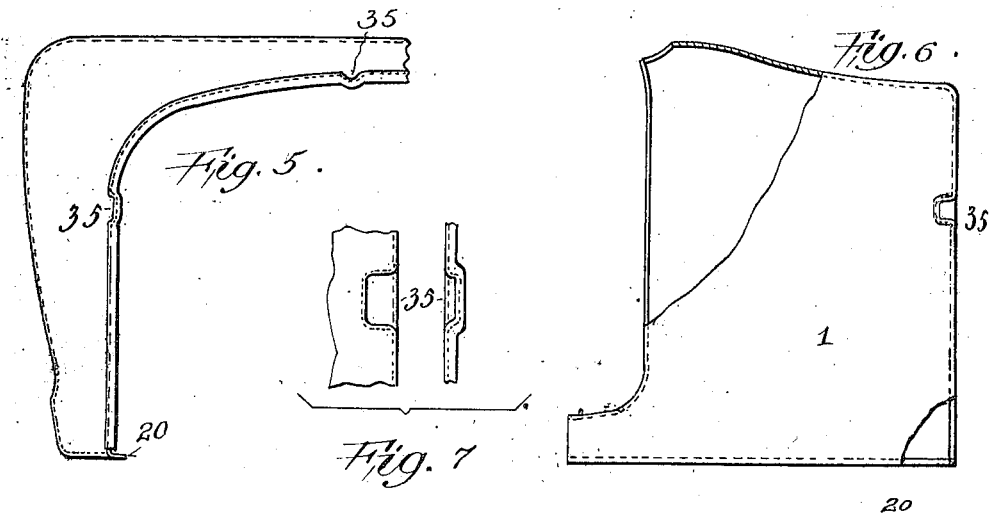
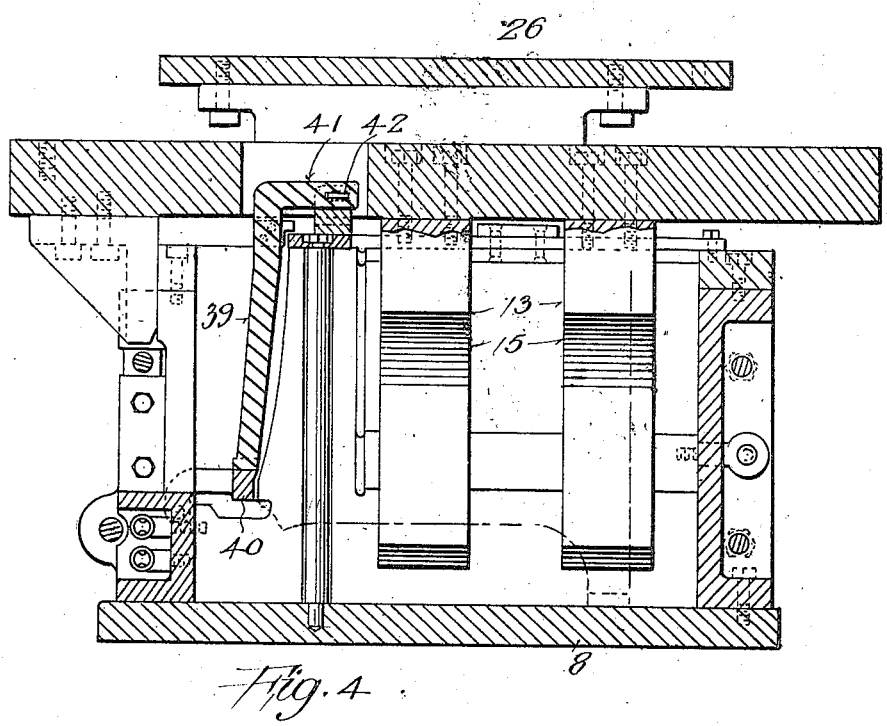
Inventor
Clayton B. Weaver

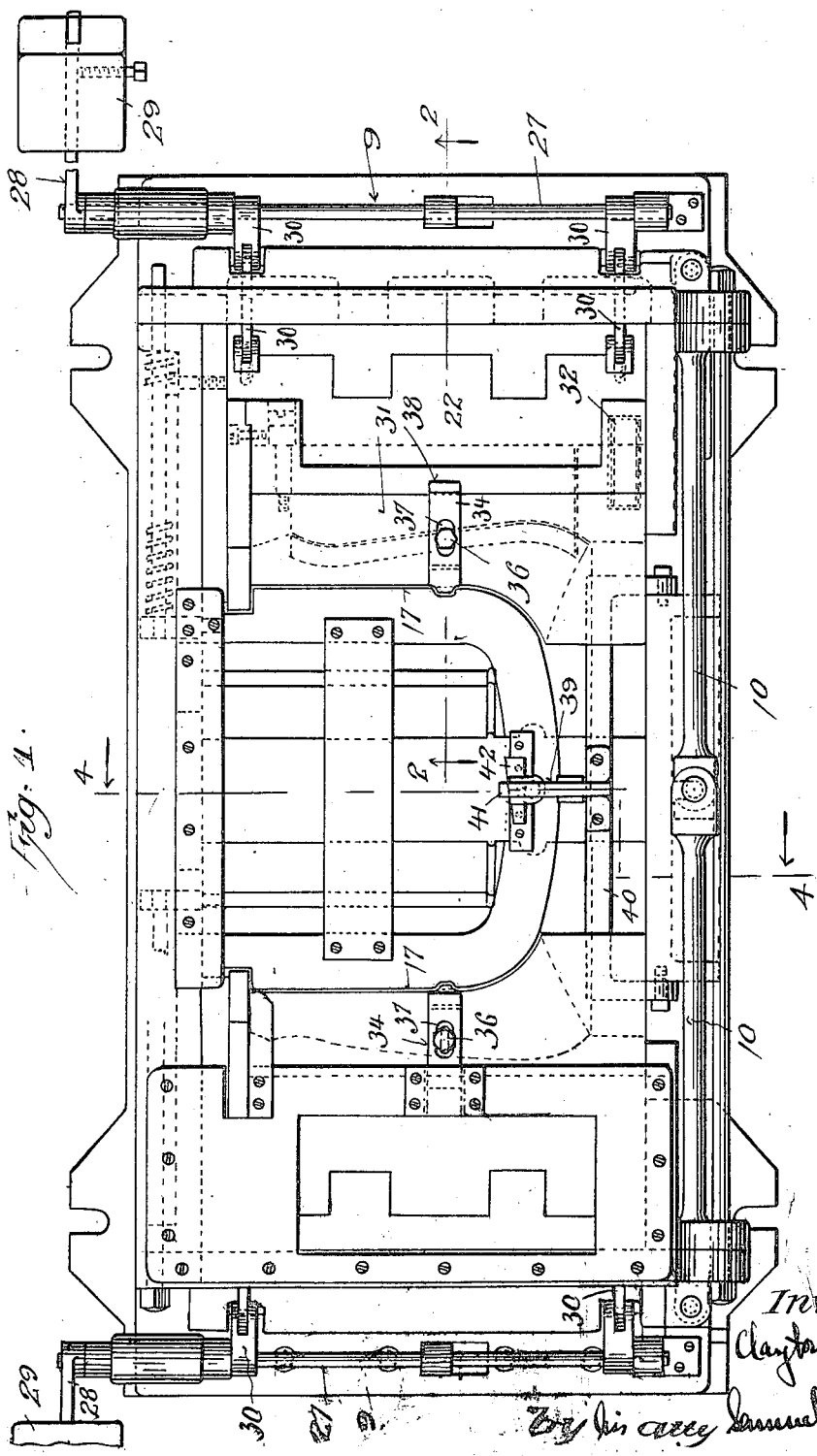

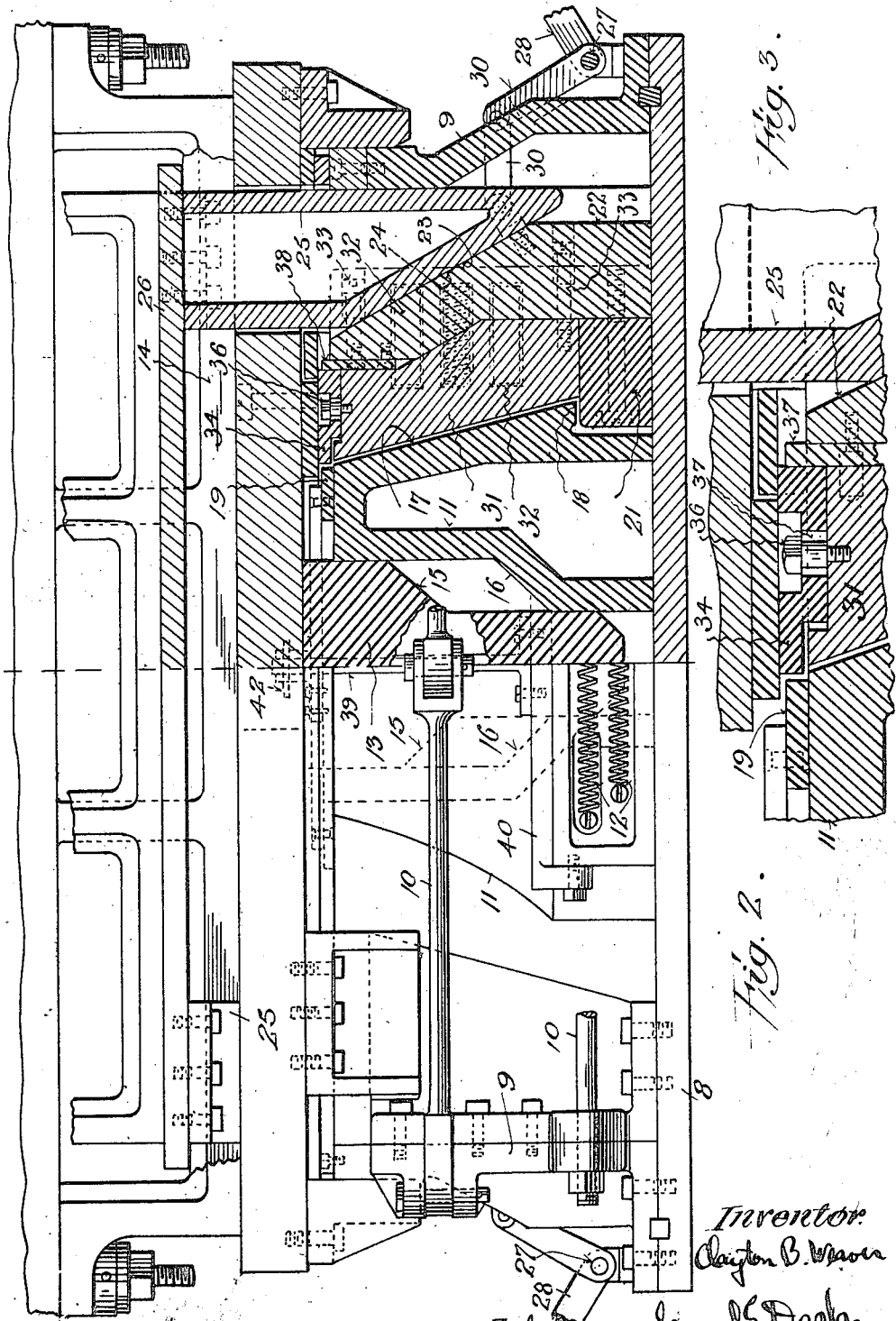

ID OF CAT

UNITED STATES PATENT OFFICE.

CLAYTON B. WEAVER, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

MACHINE FOR STAMPING SHEET-METAL SHROUDS FOR AUTOMOBILE-BODIES.

1,284,838.     Specification of Letters Patent.     Patented Nov. 12, 1918.

Application filed February 13, 1918. Serial No. 216,947.

*To all whom it may concern:*

Be it known that I, CLAYTON B. WEAVER, a citizen of the United States, residing at Philadelphia, in the county of Philadelphia, State of Pennsylvania, have made a certain new and useful Invention in Machines for Stamping Sheet-Metal Shrouds for Automobile-Bodies, of which the following is a specification.

This invention relates to machines for stamping sheet metal shrouds for automobile bodies.

The object of the invention is to provide a machine of simple structure, and which is efficient in operation, for stamping the shrouds for automobile bodies out of sheet metal and at one operation.

A further object of the invention is to provide a machine for stamping out sheet metal shrouds for automobile bodies in one operation, and wherein the flanges around the doorway at the end of the shroud and at the bottom of the shroud and for the door bumper blocks are all made in one operation.

The invention consists substantially in the construction, combination, location, and relative arrangement of parts, all as will be more fully hereinafter set forth, as shown in the accompanying drawings, and finally pointed out in the appended claims.

Referring to the accompanying drawings:—

Figure 1 is a view in top plan of the frame work and die portion of a machine embodying the principles of my invention.

Fig. 2 is a view partly in front elevation, and partly in vertical horizontal section on the line 2, 2, Fig. 1, looking in the direction of the arrows.

Fig. 3 is a broken detail view on a somewhat enlarged scale in vertical section on the plane of line 2, 2, Fig. 1.

Fig. 4 is a view in vertical transverse section on the line 4, 4, Fig. 1, looking in the direction of the arrows.

Figs. 5 and 6 are views in front elevation and side view respectively, parts broken off and parts broken out, of a shroud stamping produced in a machine embodying my invention.

Fig. 7 are details in front elevation and side views respectively showing the stamped or pressed stamping in sets for the door bumper blocks.

The same part is designated by the same reference numeral wherever it occurs throughout the several views.

Heretofore in the manufacture of shrouds for sheet steel automobile bodies it has been necessary to carry a blank or stamping through various operations in order to produce the stamping with the necessary shape or formation and flanges and recesses to constitute the finished product. This necessitates repeated handling of the stamping, the employment of various stamping machines, and is therefore not only slow but is also expensive. It is among the special purposes of my present invention to provide a machine which completes the cowl stamping in one operation with the necessary shape or conformation, flanges, and seats formed therein, thus greatly expediting the manufacture of shrouds and materially reducing the cost of manufacture thereof. In carrying out my invention I provide die blocks which are capable of being forced apart or away from each other in opposite directions and over which the sheet steel blank is applied and coöperating with the side or die surfaces of said blocks. I employ die members through the operation of which the blank is pressed into the required form or shape, the edge flanges are formed thereon, and the necessary seats or recesses provided, thus producing a completed article at one operation of a die press.

Any suitable construction of framework may be employed. In the construction shown is a base plate 8, upon which side standards 9 are erected at the ends of said base plate, said side standards being suitably braced together by tie rods 10. Mounted within this framework are the die blocks 11, which are yieldingly drawn toward each other, as for example, by means of the springs 12, but which die blocks are capable of being spread apart or separated from each other. A vertically movable plunger 13 carried by a ram member 14, which latter is power actuated, serves to effect the forcing apart of the die blocks 11, and to this end said plunger is provided with the inclined surface 15 designed to coöperate with correspondingly inclined surfaces 16 on the juxtaposed faces of the sides of the die blocks 11. On its side face or surface edge die block 11 is provided with a surface 17 upon or against which the sheet steel blank is applied and which is shaped to conform to the contour and outline of the completed stamping. This die face or surface of the die blocks is also provided with a shoulder portion 18 over or around which the sheet steel blank is pressed to form the flange for the door post in the completed cowl stamping. Also carried by each die block 11 is a die member 19 for use in pressing a recess or seat in the edge of the blank to receive a door buffer or other part required in the completed stamping. Coöperating with the lower portion of the side surface of the die block 11 and particularly with the shoulder 18 thereof to form the flange 20 at the lower edge of the stamping is a die member 21. This member is secured to a movable member 22 having an inclined surface 23 with which coöperates a similarly inclined surface 24 on plungers 25 carried by a power actuated ram 26. The member 22 is yieldingly held in retracted position away from the juxtaposed surface of the die block 11. This may be accomplished in any suitable or convenient manner. A simple arrangement is shown wherein a rock shaft 27 is journaled at each end of the base plate 8, each rock shaft carrying an arm 28 upon which is mounted a counterweight 29. The tension of the counterweights 29 are applied to the members 22 through link connections 30 respectively disposed at the ends of the member 22. Disposed between the inner face of each member 22 and the opposed side surface 17 of the die block 11 is a floater member 31 which is held and guided by studs 32 and supplied with bolts 33 respectively engaging said floater and the member 22. When the members 22 are forced toward the die face or surface of the die blocks 11 the floater 31 is likewise forced toward the same surface. Carried by the upper surface of the floater 31 is a die member 34 which coöperates with the member 19 to form the seat or recess 35 in the edge of the blank. The member 34 is adjustably mounted upon the floater 31, as for example, by means of a bolt 36 operated through an elongated slot 37 in the die member 34. A face plate 38 bolted to the inner face of the member 22 and extending above the top of the floater 31 engages the outer end of the die member 34 to afford an efficient backing therefor.

The blank when applied around or upon the die blocks 11 may be retained in place thereon in any suitable or convenient manner. For this purpose a clamp arm 39 is employed. This clamp arm is carried by a rocking support 40 which is hinged upon a horizontal axis extending lengthwise of the machine at the front side thereof so that said clamp arm may be swung forwardly out of the way to release the clamped blank or rearwardly into clamping relation to retain the blank in position. When swung into clamping position the end 41 of the clamp arm is detachably anchored in place by means of a wedge block 42, or otherwise, as may be desired.

Having now set forth the objects and nature of my invention, and a construction embodying the principles thereof, what I claim as new and useful and of my own invention, and desire to secure by Letters Patent, is:—

1. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, and means to force said movable member, die member, and floating member toward the die block.

2. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, means to force said movable member, die member, and floating member toward the die block, and means to yieldingly resist the movement of said movable member toward the die block.

3. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, means to force said movable member, die member, and floating member toward the die block, a die member carried by said floating member and a coöperating part carried by the die block.

4. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, means to force said movable member, die member, and floating member toward the die block, a die member adjustably mounted on the floating member and a coöperating die part carried by the die block.

5. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, means to force said movable member, die member, and floating member toward the die block, a die member carried by the floating member, and means carried by the movable member to engage said last mentioned die member.

6. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, guiding connections between said floating member and movable member, and means to engage said movable member to move same toward said die block.

7. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die member, said die block having a shoulder with which said die member coöperates to form a flange upon the blank, and means for moving said movable member, die member, and floating member toward the die block.

8. In a machine for stamping sheet metal shrouds for automobile bodies, the combination with a die block to receive the sheet metal blank and shaped to conform to the shroud to be produced, of a member movable toward said die block and carrying a die member, and a floating member interposed between said movable member and die block, said die member and floating member coöperating with the die block to press the blank into shape to produce the shroud, means to force said movable member, die member, and floating member toward the die block, and a counterweight connected to said movable member to yieldingly resist the movement of said movable member and die member toward the die block.

9. In a machine for stamping sheet metal shrouds for automobile bodies, the combination with a die block to receive the sheet metal blank, and shaped to conform to the shroud to be produced, of a member movable toward said die block and carrying a die member, and a floating member interposed between said movable member and die block, said movable member having an inclined surface on its outer side and a plunger having a coöperating inclined surface to engage the movable member and force same toward the die block.

10. In a machine for stamping sheet metal shrouds for automobile bodies, the combination with a die block to receive the sheet metal blank for an automobile body shroud and shaped to conform to the contour of the shroud when completed, a movable member carrying a die member, a floating member interposed between said movable member and die block, and means respectively engaging said movable member and die block to force the parts toward each other.

11. In a machine for stamping sheet metal shrouds for automobile bodies, the combination with a die block to receive the sheet metal blank for an automobile body shroud and shaped to conform to the contour of the shroud when completed, a movable member carrying a die member, a floating member interposed between said movable member and die block, means respectively engaging said movable member and die block to force the parts toward each other, and means for yieldingly resisting the movements of said die block and movable member toward each other.

12. In a machine for stamping sheet metal shrouds for automobile bodies, the combination with a die block to receive the sheet metal blank for an automobile body shroud and shaped to conform to the contour of the shroud when completed, a movable member carrying a die member, a floating member interposed between said movable member and die block, and movable plungers respectively engaging said die block and movable member to force the parts toward each other.

13. In a machine for stamping sheet metal shrouds for automobile bodies, the combination with a die block to receive the sheet metal blank for an automobile body shroud and shaped to conform to the contour of the shroud when completed, a movable member carrying a die member, a floating member interposed between said movable member and die block, said die block and movable member having inclined surfaces, and plungers having coöperating inclined surfaces respectively engaging the inclined surfaces on said die block and movable member to force the parts toward each other.

14. In a machine for stamping sheet metal shrouds for automobile bodies, the combination with a die block to receive the sheet metal blank for an automobile body shroud and shaped to conform to the contour of the shroud when completed, a movable member carrying a die member, a floating member interposed between said movable member and die block, said die block and movable member having inclined surfaces, and plungers having coöperating inclined surfaces respectively engaging the inclined surfaces on said die block and movable member to force the parts toward each other, and means to yieldingly resist the movements of said die block and movable member toward each other.

15. In a machine for making sheet metal shrouds for automobile bodies, the combination with a pair of die blocks to receive the sheet metal blank, said die blocks being shaped to conform to the shroud when completed, a movable member juxtaposed with reference to the die surface of each die block and each carrying a die member, a floating member interposed between each movable member and opposed surface of its coöperating die block, and means engaging between the die blocks to force the same apart and toward the movable member.

16. In a machine for making sheet metal shrouds for automobile bodies, the combination with a pair of die blocks to receive the sheet metal blank, said die blocks being shaped to conform to the shroud when completed, a movable member juxtaposed with reference to the die surface of each die block and each carrying a die member, a floating member interposed between each movable member and opposed surface of its coöperating die block, means engaging between the die blocks to force the same apart and toward the movable member, and means to yieldingly resist the movements of the die blocks.

In testimony whereof I have hereunto set my hand on this 8th day of February, A. D., 1918.

CLAYTON B. WEAVER.